(12) United States Patent
Toro

(10) Patent No.: US 8,202,207 B2
(45) Date of Patent: Jun. 19, 2012

(54) BLANK FOR PACKING SUBSTANTIALLY FLAT ARTICLES, A METHOD AND MACHINE FOR MAKING THE BLANK

(75) Inventor: Andrea Toro, Sassuolo (IT)

(73) Assignee: System S.p.A., Fiorano Modenese (IT)

( * ) Notice: Subject to any disclaimer, the term of this patent is extended or adjusted under 35 U.S.C. 154(b) by 0 days.

(21) Appl. No.: 13/097,299

(22) Filed: Apr. 29, 2011

(65) Prior Publication Data

US 2011/0214402 A1 Sep. 8, 2011

Related U.S. Application Data

(62) Division of application No. 12/301,970, filed as application No. PCT/IB2007/001580 on May 23, 2007, now Pat. No. 7,954,304.

(30) Foreign Application Priority Data

Jun. 20, 2006 (IT) .............................. MO2006A0200

(51) Int. Cl.
*B31B 1/14* (2006.01)
(52) U.S. Cl. .............................. 493/56; 493/397; 53/562
(58) Field of Classification Search .................... 493/56, 493/429, 458, 397, 59, 80, 128, 70, 79, 405; 53/455, 562, 558, 456, 429
See application file for complete search history.

(56) References Cited

U.S. PATENT DOCUMENTS

| | | | |
|---|---|---|---|
| 1,639,793 A | 8/1927 | Beyer | |
| 1,691,178 A | 11/1928 | Beaman | |
| 1,862,205 A | 6/1932 | Stokes | |
| 2,673,430 A * | 3/1954 | Fleischer et al. | 53/546 |
| 2,779,463 A | 1/1957 | Zimmerman | |
| 2,960,217 A | 11/1960 | Nason | |
| 3,035,381 A * | 5/1962 | Hosso | 53/568 |
| 3,438,521 A * | 4/1969 | Munck | 53/399 |
| 3,499,597 A | 3/1970 | Katzman | |
| 4,178,739 A * | 12/1979 | Du Broff | 53/588 |
| 4,292,785 A * | 10/1981 | Hammond | 53/399 |
| 4,519,500 A * | 5/1985 | Perchak | 206/312 |
| 4,610,355 A | 9/1986 | Maurer | |
| 4,807,804 A | 2/1989 | Schwaner et al. | |
| 5,161,692 A | 11/1992 | Knierim | |
| 5,675,963 A * | 10/1997 | Nicholson et al. | 53/540 |
| 6,128,887 A * | 10/2000 | Suokas et al. | 53/446 |

FOREIGN PATENT DOCUMENTS

| | | |
|---|---|---|
| DE | 10331739 A1 | 1/2005 |
| FR | 2766795 A1 | 2/1999 |
| GB | 315131 A | 7/1929 |

* cited by examiner

Primary Examiner — Sameh H. Tawfik
(74) Attorney, Agent, or Firm — Pearne & Gordon LLP

(57) ABSTRACT

The invention relates to a blank (1), a method and a machine (11) for realising the blank (1). The blank (1) is constituted by four lengths (5) which are consecutively joined to form a structure (2) or frame (6) which can be folded around one or more flat articles (4) or tiles to be packed. The machine (11) and the method for realising the blanks (1) include supplying identical panels of cardboard which are joined to constitute a continuous strip (10) and which are subsequently cut to correspond to lengths of sides of the tiles. Each length (5) is joined to a consecutive length (5) by deposits (7a) of glue.

24 Claims, 2 Drawing Sheets

BLANK FOR PACKING SUBSTANTIALLY FLAT ARTICLES, A METHOD AND MACHINE FOR MAKING THE BLANK

TECHNICAL FIELD

The invention relates to a blank for packing substantially flat objects exhibiting substantially polygonal shapes, in particular tiles and/or like construction articles.

Also object of the present invention is a method for realising blanks for packing substantially flat objects exhibiting shapes which are substantially polygonal, in particular tiles and/or like construction articles.

A further object of the present invention is a machine for realising blanks for packing substantially flat objects exhibiting shapes which are substantially polygonal, in particular tiles and/or like construction articles.

The invention applies to the sector of packing flat objects which are substantially polygonal, and in particular is usefully applied in packing construction articles such as tiles, floor bricks, slabs, panels and/or the like.

BACKGROUND ART

As is known, the packing of construction articles, such as for example tiles and/or the like, is performed by using special blanks, generally made of corrugated cardboard, which are specially prepared by specialist paper design companies, cardboard manufacturers and the like.

From among the various types of known packs, blanks are usually chosen which partially envelop the article or pile of articles to be packed.

A first example of the above type of blank exhibits, in a flat development, a polygonal central sector, usually rectangular, similar to the articles to be packed. From each side of the central sector, respective lateral sectors extend which each exhibit a fold line which is parallel to the side of the corresponding central sector.

The central sector is destined to receive the articles to be packed directly upon it, while the lateral sectors are specially folded along the sides of the central sector and the respective creased lines such that the flanks of the articles are totally covered and protected. In this way, a part of each lateral sector covers, on the opposite side to the central sector, a respective peripheral portion of the packed flat articles which remain substantially free in the central zone thereof.

A second example of the above-mentioned blanks exhibits a substantially rectilinear flat development which is sub-divided into a plurality of sectors defining a central strip relative to the flanks of the articles to be packed, and two lateral strips which relate to respective bottom and top peripheral portions of the articles.

The folding of the blanks gives rise to packs which cover both the flanks and the edges of the flat packed articles, leaving respective top and bottom central zones free.

Both of the above examples of blanks include superposing zones which are glued during the folding thereof about the article or group of articles to be packed.

Document DE 10331739 discloses a pack with lateral walls formed from separate blanks and glued to a bottom board, the lateral walls being joined together by means of adhesive tape.

Although the known blanks enable one or more flat-shaped articles to be packed, the applicant has noted that the arrangement is not free of drawbacks, mainly in relation to the high costs for realising and/or buying the blanks, to the poor flexibility of use thereof as well as to the necessary presence of various stores each dedicated to different formats of the articles to be packed.

In particular, it has been observed that the costs of preparation of the blanks by the paper companies and/or the like have an excessive effect on the marketing of the flat articles to be packed. The blanks require a high number of work operations, including cutting, line-creasing and/or finishing Further, each blank is singly prepared for packing a respective type of flat article, and cannot be used for articles exhibiting different dimensions.

To add to this, the producer of the flat articles is obliged to use a series of stores, each dedicated to particular type of blank. This is inevitable and is due to an exclusive correspondence between blank and article to be packed, but leads to a further increase in costs of placing the articles on sale.

An aim of the present invention is to resolve the above-described drawbacks.

An aim of the present invention is to provide a blank for packing substantially flat-shaped articles which is economically viable.

A further aim of the present invention is to provide an assemblable blank which is adaptable to different dimensions of different flat articles.

A further aim of the present invention is to provide an assemblable blank the parts of which are drawn from sheets of packing material which are substantially identical and which require only one store.

A further aim of the present invention is to provide a method for realising the above-described blank, which method is economical and easy to set up.

A further aim of the present invention is to provide a machine for realising the above-mentioned blank which is economical, simple and which exhibits a substantially contained mass.

The specified technical task and the specified aims are substantially achieved by a blank for packing substantially flat articles exhibiting substantially polygonal shapes, in particular tiles and/or like construction articles, according to what is claimed in the appended claims.

The specified technical task and the specific aims are further attained by a method and a machine for realising a blank for packing substantially polygonal articles, in particular tiles and/or like construction articles, according to what is claimed herein below.

DISCLOSURE OF INVENTION

Further characteristics and advantages of the present invention will better emerge from the detailed description that follows, of a preferred embodiment of the invention which is illustrated by way of non-limiting example in the figures of the accompanying drawings, in which.

With reference to the figures of the drawings, 1 denotes in its entirety a blank for packing flat articles exhibiting substantially polygonal shapes, in particular tiles and/or like construction articles, in agreement with the present invention.

Figure 3:
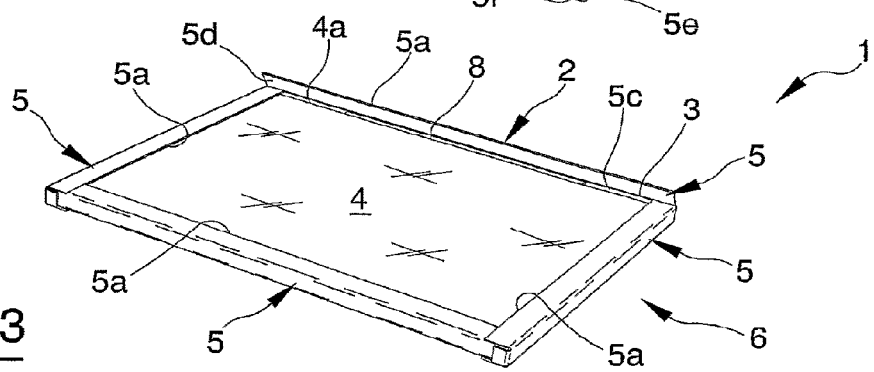
FIG. 3 is a further perspective view of the blank of the preceding figures, folded about one or more flat articles.

As can be seen in figures from 1 to 4, the blank 1 comprises at least a structure 2 realised in a packaging material, preferably corrugated cardboard. The structure 2 exhibits a plurality of fold lines 3 for folding the blank 1 at least partially about at least a flat-shaped article 4 (FIG. 3) to be packed.

The structure 2 preferably comprises at least a length 5 of packing material for each side 4a of the substantially polygonal shape of the flat article 4 to be packed.

In particular, the lengths 5 are consecutively engaged to define a frame 6 exhibiting a substantially polygonal shape, the shape of which is preferably identical to the shape of the flat article 4 to be packed.

With reference to the embodiment illustrated in the accompanying figures of the drawings, the shape of the frame 6 is substantially quadrangular, preferably rectangular, for packing tiles and/or like flat articles 4.

As can be seen in the figures of the drawings, each length 5 exhibits a substantially rectangular shape and at least two fold lines 3 which are substantially parallel to the larger sides 5a of the rectangular shape of the length 5.

Figure 1:
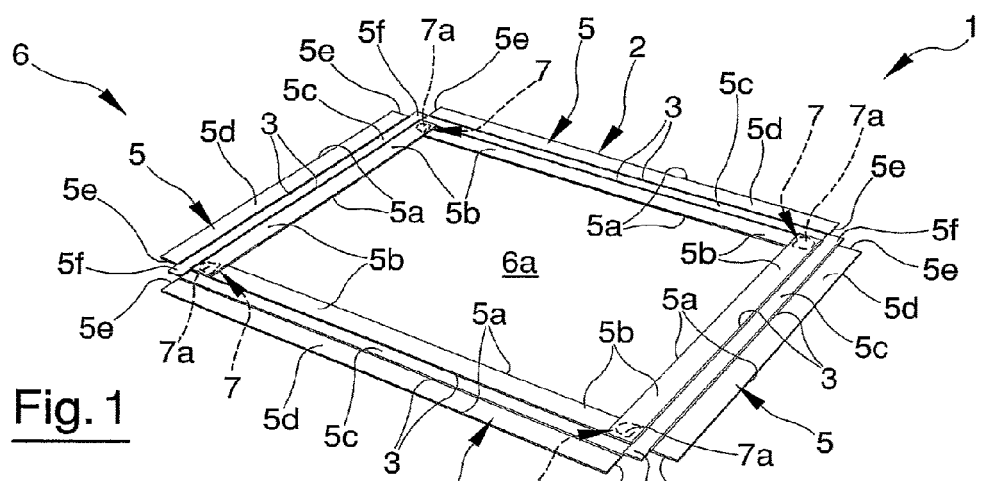
FIG. 1 is a perspective view of a blank for packing fiat articles exhibiting substantially polygonal shapes, in particular tiles and/or like construction articles, in agreement with the present invention.
Figure 2:
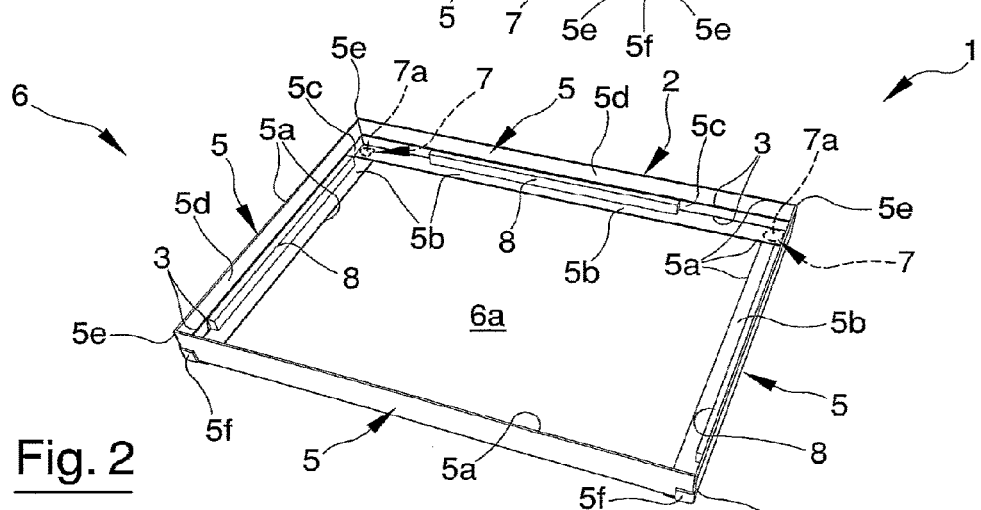
FIG. 2 is a perspective view of the blank of FIG. 1, shown partially folded.

The fold lines 3 of each length 5 advantageously define a resting zone 5b (FIGS. 1, 2 and 4) for placing at least a bottom portion of the flat article 4 to be packed, a lateral protection zone Sc corresponding to a respective flank or side 4a of the flat article 4 and a covering zone 5d destined to engage a portion of the flat-shaped article 4 on an opposite side thereof with respect to the resting zone 5b.

With reference to the flat development of each length 5 (FIGS. 1 and 4), the lateral protection zone 5c is interposed between the two fold lines 3 to define a substantially rectangular central band, while the resting zone 5b and the covering zone 5d are arranged adjacent with respect to the lateral protection zone 5c, to define substantially rectangular respective lateral bands.

With reference to the flat development of the frame 6 (FIGS. 1 to 4) defined by the structure 2 of the blank 1, the resting zone 5b of each length 5 is arranged substantially internally, i.e. facing a central space 6a defined by the frame, while the covering zone 5d is substantially arranged externally, i.e. facing the opposite way with respect to the central space 6a of the respective frame 6.

The lengths 5 are preferably consecutively engaged to one another by special means for joining 7.

The means for joining 7 advantageously comprise respective deposits 7a of a glue material interposed between at least partially superposed ends 5e of consecutive lengths 5. In detail, the deposits 7a of glue material are interposed between rest zones 5b of respective consecutive lengths 5, which are partially superposed.

At least one of the lengths 5 constituting the frame 6 advantageously exhibits at least a foldable connecting flap 5f predisposed to act on a consecutive length 5. The connecting flap 5f of the respective length 5 projects with respect to the shape of the length 5 from the lateral protection zone 5c.

In the embodiment illustrated in the accompanying figures of the drawings, at least two lengths 5 constituting the frame 6 are provided with two connecting flaps 5f projecting from the respective ends 5e.

With reference to the frame 6 (FIGS. 1-4), the lengths 5 provided with connecting flaps 5f are arranged substantially parallel on opposite sides of the lengths 5 which do not exhibit connecting flaps.

The structure 2 of the blank 1 is advantageously provided, for each length 5, with at least a protective insert 8 which is interposable between the length 5 and the flat article 4 to be packed.

Each protective insert 8 is preferably engaged to the relative length 5 at the lateral protection zone 5b such as to increase the protection of the sides of the flat articles 4 being packed.

The blank 1 is advantageously realised using a method which includes a predisposition or realisation of the structure 2 in corrugated cardboard provided with fold lines 3 for at least partially folding the structure 2 about at least a flat article 4.

In detail, the predisposing of the structure 2 includes first a preparation of at least a length 5 for each side 4a of the outline of the flat article 4 to be packed, a weakening of each length 5 along at least two predetermined fold lines 3, and finally the consecutive joining-up of the lengths 5 in order to define the frame 6, the form of which preferably reproduces the substantially polygonal shape of the outline of the flat object 4 to be packed.

With reference to the forming of the lengths 5, they are advantageously realised starting from the supply of special panels 9 of packing material which are substantially identical and which are supplied in series.

The panels 9 are consecutively joined, preferably by means of at least a gluing operation, such as to constitute a continuous strip 10 of packing material extending along a predetermined development direction.

The creasing of the lengths 5 is advantageously performed directly on the continuous strip 10 following formation thereof, and requires at least a control operation of the thickness of the flat article 4 or the pile of flat articles to be packed in order to establish the distance between the fold lines 3.

Then the continuous strip 10 is cut transversally to its development direction at a predetermined interval, in order to define the substantially rectangular shape and the dimensions of the length 5 being prepared. The relative measuring of the cut of the length 5 is preferably set with reference to the length of the corresponding side 4a of the shape of the flat article 4 to be packed.

The following stage of joining the lengths 5 is performed by depositing a predetermined quantity of a glue onto one of the lengths 5 being prepared, and by at least partially superposing one of the lengths 5 onto another consecutive length 5.

With reference to the embodiment illustrated in the accompanying figures of the drawings, the depositing of the glue material is performed on two lengths 5 which are destined to be arranged on opposite sides of the structure 2. In particular, the depositing of the glue is preferably done at the ends of the lengths 5 such as to enable a superposing thereof on respective ends of consecutive lengths 5 not exhibiting glue.

Before the joining stage of the lengths 5 there is at least a stage of realising one and preferably two connecting flaps 5f on at least a length 5 under preparation.

With reference to the solution illustrated in the figures of the drawings, each frame 6 is provided with at least two lengths 5, preferably opposite, provided with two connecting flaps 5f.

The method further includes, before the joining stage of the lengths 5, a stage of applying at least a protective insert 8 to at least one of the lengths 5 destined to form a respective blank 1.

In particular, for each length 5 destined to constitute the structure 2 of the respective blank 1, respective stages of application of protective inserts 8 are performed, which inserts 8 are fixed to the lengths 5 by means of one or more gluing operations.

Once the lengths 5 have been joined, the structure 2 of the blank 1 is appropriately folded along the fold lines 3 about the flat articles 4 to be packed.

The blank 1 is stabilised in the folded configuration by one or more gluing operations, and is then sent for storage.

The above-described method is preferably done using a machine 11 (FIG. 4) which comprises at least a packing station 12 at which at least a blank 1 is folded at least partially about the flat article 4 to be packed.

Figure 4:
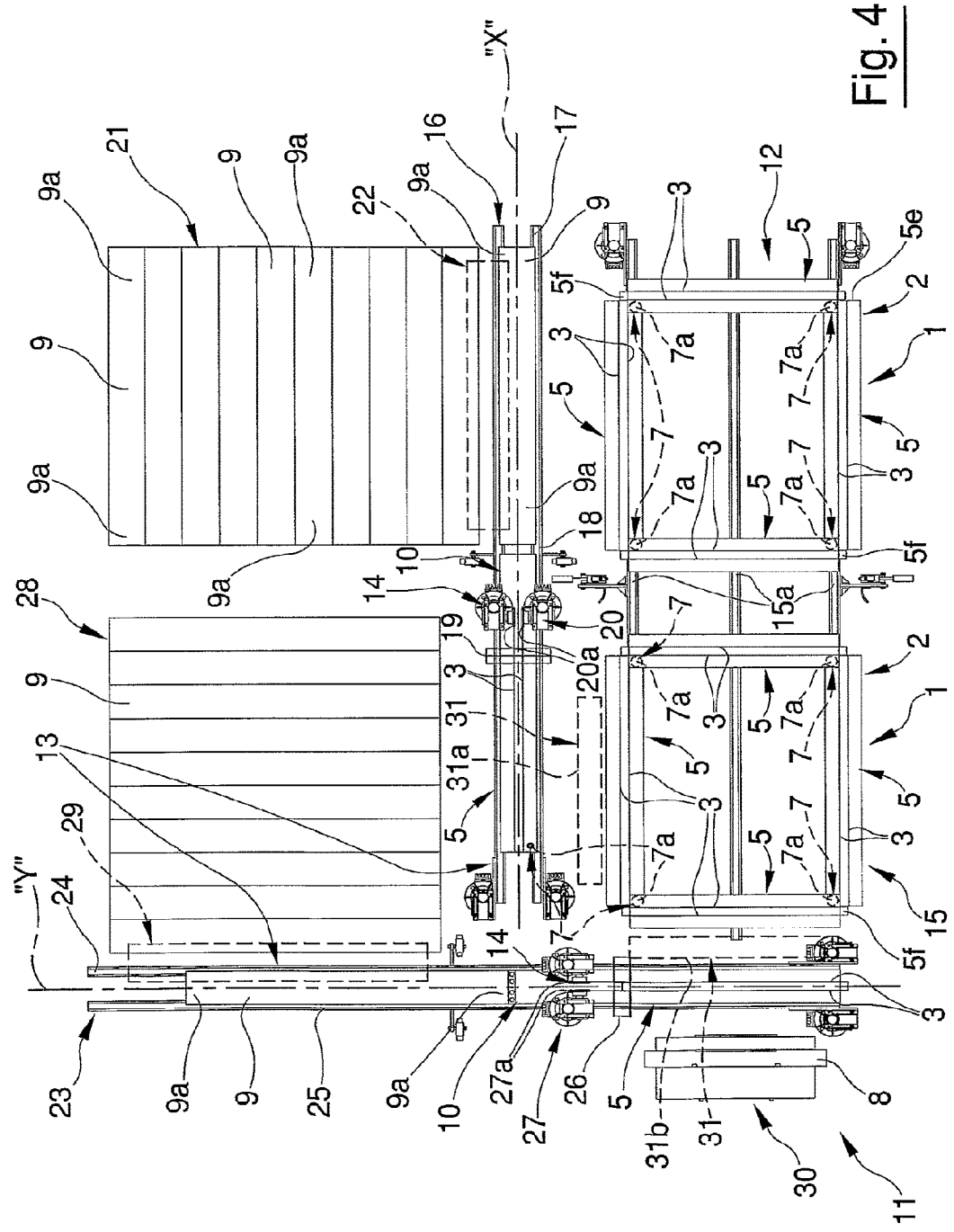
FIG. 4 is a plan view of a machine for realising the blank of the preceding figures, in agreement with the present invention.

As can be seen in FIG. 4, the machine 11 comprises at least a preparation station 13 of the lengths 5. The preparation station 13 is predisposed to define, at least partially, a length 5 of packing material for each side 4a of the flat articles 4 to be packed.

The machine 11 further comprises at least a creasing station 14 operatively associated to the preparation station 13, which creasing station 14 realises at least two predetermined fold lines 3 on each length 5 under preparation, and at least an assembly station 15 at which the lengths 5 are consecutively joined to define the above-described frame 6.

Still with reference to FIG. 4, the preparation station 13 comprises a first preparation line 16 which defines a substantially straight first advancement direction X of the packing material.

In detail, the preparation line 16 is provided with at least a loading unit 17 at which the above-mentioned panels 9 being supplied are deposited to move along the respective first advancement direction X.

With reference to the first advancement direction X, downstream of the loading unit 17, the first preparation line 16 further comprises a joining unit 18 for consecutive joining of the panels 9, to form at least the respective continuous strip 10 of packing material. The joining unit 18 preferably comprises at least a gluing device (not illustrated) which joins the opposite ends 9a of the consecutive panels 9.

The first preparation line 16 further comprises, downstream of the joining unit 18, a cutting unit 19 which cuts the continuous strip 10 in supply, such as to define at least a length 5 of a predetermined size, preferably predetermined according to a length of a side 4a of a flat article 4 to be packed.

As can be observed in FIG. 4, the creasing station 14 comprises a first creasing unit 20 which is operatively associated to the first preparation line 19 between the joining unit 17 and the cutting unit 19 thereof. The first creasing unit 20 comprises at least a pair of creasing discs 20a lying on substantially parallel planes to the first advancement direction X and being transversal to the lie plane of the continuous strip 10 advancing along the first preparation line 16.

The creasing discs 20a of the creasing unit 20 are advantageously adjustable to near or distance from one another along a transversal direction to lie planes thereof, such as to determine the distance between the respective fold lines 3 generated along the continuous strip 10. In other words, the regulating of the creasing discs 20a determines the width of the lateral protection zone 5c of the lengths 5 in relation to the thicknesses of the flat articles 4 or the pile of flat articles 4 to be packed.

The first preparation line 16 further exhibits suitable means for depositing (not illustrated) predisposed to deposit, on each length 5 formed or on the continuous strip 10 still to be cut, predetermined quantities of a glue destined to ensure a join between consecutive lengths 5 which are partially superposed on one another.

As illustrated in FIG. 4, a first store 21 of the panels 9 is operatively associated to the first preparation line 16. The panels 9 are preferably orientated parallel to the first advancement line X.

The machine 11 further comprises first means for loading 22, preferably suckers, which can be activated between a collecting condition, in which they intercept and grip at least a panel 9 of the first store 21, and a release condition, in which the panel 9 removed is deposited in the respective loading unit 17 of the first preparation line 16.

Still with reference to FIG. 4, the preparation station 13 comprises a second preparation line 23 defining a predetermined second advancement direction Y of the packing material.

The second preparation line 23 extends transversally, preferably perpendicular to the first advancement direction X.

Like the first preparation line 16, the second preparation line 23 comprises a loading unit 24 at which the above-mentioned panels 9 are deposited in order to move along the second advancement direction Y.

With reference to the second advancement direction Y, the second preparation line 23 comprises, downstream of the loading unit 24, a joining unit 25 for consecutive joining of panels 9 to form at least a continuous strip 10 of packing material. The joining unit 25 preferably comprises at least a gluing device (not illustrated) which is able to join opposite ends 10a of consecutive panels 9 arranged along the second preparation line 23.

The second preparation line 23 further comprises, downstream of the joining unit 25, a cutting unit 26 of the continuous strip 10, such as to define at least a length 5 of a predetermined measurement, preferably set to correspond with the side 4a of the flat articles 4 to be packed.

The cutting unit 26 of the second preparation line 23 is advantageously able to cut the continuous strip 10 advancing along the second advancement direction Y in such a way as also to create the above-mentioned connecting flaps 5f of the lengths 5 being prepared. In particular, when the cutting unit 26 is activated, it cuts the respective continuous strip 10 and defines the connecting flap 5f of the realised length 5 as well as the connecting flap 5f of the end 5e of the length 5 which is part of the advancing continuous strip 10.

As can be seen in FIG. 4, the creasing station 14 further comprises a second creasing unit 27, operatively associated to the second preparation line 23 between the joining unit 25 and the respective cutting unit 26. The second creasing unit 27 comprises at least a pair of creasing discs 27a lying on substantially parallel planes to the second advancement direction Y, which planes are transversal to the lie plane of the continuous strip 10 advancing along the second preparation line 23.

The creasing discs 27a of the second creasing unit 27 are advantageously adjustable to near and/or distance reciprocally along a plane which is transversal to the lie planes thereof, such as to determine a distance between the respective fold lines 3 generated along the continuous strip 10. In other words, the adjustment of the creasing discs 27a determines the width of the lateral protection zone 5c of the lengths 5 being prepared corresponding to the width of the flat article 4 or the pile of flat articles 4 to be packed.

As illustrated in FIG. 4, a second store 28 of the panels 9 is operatively associated to the second preparation line 23, the panels 9 being preferably oriented parallel to the first advancement direction Y.

The stores 21, 28 respectively of the first and the second preparation lines 16, 23 are advantageously arranged in close vicinity, one by the side of the other. The machine 11 further comprises second means for loading 29, preferably suckers, which can be activated between a removing condition, in which they intercept and grip at least a panel 9 of the second store 28, and a release condition, in which the removed panel 9 is deposited in the respective loading unit 24 of the second preparation line 23.

Still with reference to FIG. 4, the machine 11 further comprises means for applying 30 which are operatively associated to the preparation station 13, for applying at least a protective insert 8 to a length 5 under preparation before the joining of the length 5 to a consecutive length 5.

In the embodiment of FIG. 4, the means for applying 30 are represented, for reasons of clarity, only along the second preparation line 23 downstream of the cutting unit 26. Of note however is the fact that the machine 11 is also predisposed to apply the protective insert 8 on the lengths 5 being prepared on the first preparation line 16, so that a unit (not illustrated) of the means for applying 30 is included downstream of the cutting unit 19 of the first preparation line 16.

Still with reference to FIG. 4, the above-mentioned assembly station 15 defines, with three sliding bars 15*a*, a rest plane 15*b* for the realisation of the above-described frames 6. The rest plane 15*b* preferably extends substantially parallel to at least one of the preparation lines 16 and 23 of the preparation station 13.

The machine 11 advantageously comprises means for transferring 31 which are operatively interposed between the preparation station 13 and the assembly station 15 to move the lengths 5 from the preparation station 13 to the assembly station 15.

In particular, the means for transferring 31 comprise a first transfer unit 31*a*, preferably with sucker grips and destined to move the lengths 5 from the first preparation line 16 to the assembly station 15, and a second transfer unit 31*b*, preferably with sucker grips and destined to move the lengths 5 from the second preparation line 23 to the assembly station 15.

As illustrated in FIG. 4, the first transfer unit 31*a* consecutively removes two lengths 5 provided with glue 7*a* deposits and places them on the rest plane 15*b* of the assembly station 15, in a parallel arrangement. The second transfer unit 3 1*b* consecutively removes two lengths exhibiting connecting flaps 5*f* and places them in a parallel arrangement on the rest plane 15*b* of the assembly station 15, perpendicular to the previously-placed lengths 5. The lengths 5 exhibiting the connecting flaps 5*f* are deposited on the assembly station 15 in such a way as to cover the glue 7*a* deposits on the previously-deposited lengths 5.

The packing station 12 is advantageously located adjacent to the assembly station 15 so that each blank 1 formed in the assembly station 5 is transferred to the packing station 12 in order to be folded about a flat article 4 or a pile of flat articles 4.

The invention obviates the problems encountered in the prior art and attains the set aims.

Primarily, the object of the invention enables a considerable reduction in the realisation costs of the blanks for the packaging of the above-mentioned flat articles, as the blanks are realised starting from identical panels, rectangular and simple, of packing material, and require the performance of a small number of operating stages.

The realising of lengths the dimensions of which can be modified enables assemblable structures to be realised, which structures are dedicated to the respective flat articles to be packed. The fact that blanks of different sizes can be assembled means that the production method of the blanks can be rapidly adapted to the different dimensions of the various types of articles.

Also, the producers of the above-described flat articles can use a machine which is simple, inexpensive and compact, without having to pay specialised paper manufacturers and further add to costs of the blanks.

Further, the supplying of the packing material in the form of identical panels requires the use of a single type of storage store, which leads to a considerable economic saving as only one type of store is required.

The invention claimed is:

1. A machine (11) for realising blanks (1) for packing substantially flat articles (4) exhibiting substantially polygonal shapes, in particular tiles and/or like construction articles, comprising at least a packing station (12) at which the blank (1) is folded at least partially about the at least a flat article (4), wherein it comprises:
   at least a preparation station (13) of lengths (5) of packing material, the preparation station (13) being predisposed at least partially to create a length (5) of packing material for each side (4*a*) of the at least a flat article (4) to be packed;
   at least a creasing station (14), operatively associated to the preparation station (13), for realising at least two predetermined fold lines (3) on each length (5) under preparation;
   at least an assembly station (15) at which the lengths (5) are consecutively joined to define a frame (6) having a substantially polygonal shape, a shape of which preferably reproduces the substantially polygonal shape of the flat article (4) to be packed.

2. The machine of claim 1, wherein the preparation station (13) comprises a first preparation line (16) defining a predetermined first advancement direction (X) of the packing material.

3. The machine of claim 2, wherein the first preparation line (16) comprises:
   a loading unit (17) of panels (9) made of packing material, the panels (9) being substantially identical;
   a joining unit (18) for consecutive joining of the panels (9) in order to form at least a continuous strip (10) of packing material;
   a cutting unit (19) for cutting the continuous strip (10) into at least a predetermined length (5).

4. The machine of claim 3, wherein the joining unit (18) comprises at least a gluing device able to join opposite ends (9*a*) of consecutive panels (9).

5. The machine of claim 3, wherein the creasing station (14) comprises a first creasing unit (20) which is operatively associated to the first preparation line (16) between the joining unit (18) and the cutting unit (19).

6. The machine of claim 5, wherein the first creasing unit (20) comprises at least a pair of creasing discs (20*a*) lying on planes which are substantially parallel to the first advancement direction (X) and transversal to a lie plane of the continuous strip (10).

7. The machine of claim 6, wherein the creasing discs (20*a*) of the first creasing unit (20) are adjustable in order to near and/or distance to one another along a transversal direction to a lie plane thereof, the adjusting of the creasing discs (20*a*) determining a distance between the fold lines (3) generated by the creasing discs (20*a*) on the continuous strip (10).

8. The machine of claim 2, wherein the first preparation line (16) is operatively associated to a first store (21) of the panels (9).

9. The machine of claim 8, wherein the panels (9) arranged in the first store (21) are oriented parallel to the first advancement direction (X).

10. The machine of claim 9, wherein the first preparation line (16) comprises:
- a loading unit (17) of panels (9) made of packing material, the panels (9) being substantially identical;
- a joining unit (18) for consecutive joining of the panels (9) in order to form at least a continuous strip (10) of packing material;
- a cutting unit (19) for cutting the continuous strip (10) into at least a predetermined length (5), and wherein the machine comprises first means for loading (22) activatable between a collecting condition, in which the first means for loading (22) intercept and grip at least a panel (9) in the first store (21), and a release condition, in which the gripped panel (9) is deposited in the loading unit (17) of the first preparation line (16).

11. The machine of claim 1, wherein the preparation station (13) comprises a second preparation line (23) defining a predetermined second advancement direction (Y) of the packing material.

12. The machine of claim 11, wherein the preparation station (13) comprises a first preparation line (16) defining a predetermined first advancement direction (X) of the packing material, and wherein the second preparation line (23) extends transversally, preferably perpendicular, to the first advancement direction (X).

13. The machine of claim 11, wherein the second preparation line (23) comprises:
- a loading unit (24) of panels (9) made of packing material, the panels (9) being substantially identical to the panels (9) of the loading unit (17) of the first preparation line (16);
- a joining unit (25) for consecutive joining of the panels (9) to form at least a continuous strip (10) of packing material;
- a cutting unit (26) for cutting the continuous strip (10) into at least a length (5) in a predetermined measure.

14. The machine of claim 13, wherein the joining unit (23) comprises at least a gluing device able to join opposite ends (9a) of consecutive panels (9).

15. The machine of claim 13, wherein the creasing station (14) comprises a second creasing unit (27) which is operatively associated to the second preparation line (23) between the joining unit (25) and the cutting unit (26).

16. The machine of claim 15, wherein the second creasing unit (27) comprises at least a pair of creasing discs (27a) lying on substantially parallel planes to the second advancement direction (Y), which planes are transversal to a lie plane of the continuous strip (10).

17. The machine of claim 16, wherein the creasing discs (27a) of the second creasing unit (27) are adjustable to near and/or distance from one another along a transversal direction to the lie planes thereof, the adjusting of the creasing discs (27a) determining a distance between the fold lines (3) generated by the creasing discs (27a) on the continuous strip (10).

18. The machine of claim 11, wherein a second store (28) of the panels (9) is operatively associated to the second preparation line (23).

19. The machine of claim 18, wherein the panels (9) arranged in the second store (28) are oriented parallel to the second advancement direction (Y).

20. The machine of claim 19, wherein the second preparation line (23) comprises:
- a loading unit (24) of panels (9) made of packing material, the panels (9) being substantially identical to the panels (9) of the loading unit (17) of the first preparation line (16);
- a joining unit (25) for consecutive joining of the panels (9) to form at least a continuous strip (10) of packing material;
- a cutting unit (26) for cutting the continuous strip (10) into at least a length (5) in a predetermined measure, and wherein the machine comprises second means for loading (29) activatable between a collection condition, in which the second means for loading (29) intercept and grip at least a panel (9) of the second store (28), and a release condition, in which the gripped panel (9) is deposited in the loading unit (24) of the second preparation line (23).

21. The machine of claim 11, wherein the assembly station (15) exhibits a rest plane (15b) for realising the blank (1), the rest plane (15b) extending substantially parallel to at least one of the preparation lines (16, 23).

22. The machine of claim 1, wherein the preparation station (13) comprises means for depositing predisposed to deposit, on each length (5), a predetermined quantity of a glue destined to join partially superposed consecutive lengths (5).

23. The machine of claim 1, wherein it comprises means for transferring, operatively interposed between the preparation station (13) and the assembly station (15) in order to displace the lengths (5) from the preparation station (13) to the assembly station (15).

24. The machine of claim 1, wherein it comprises means for applying (30) which are operatively associated to the preparation station (13) for applying at least a protective insert (8) to a respective length (5).

* * * * *